US011573660B2

(12) United States Patent
Hisano

(10) Patent No.: US 11,573,660 B2
(45) Date of Patent: Feb. 7, 2023

(54) SYSTEM INCLUDING PEN AND SENSOR CONTROLLER, PEN, AND SENSOR CONTROLLER

(71) Applicant: Wacom Co., Ltd., Saitama (JP)

(72) Inventor: Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/559,560

(22) Filed: Dec. 22, 2021

(65) Prior Publication Data
US 2022/0221972 A1 Jul. 14, 2022

(30) Foreign Application Priority Data
Jan. 12, 2021 (JP) .............................. JP2021-002960

(51) Int. Cl.
G06F 3/038 (2013.01)
G06F 3/041 (2006.01)
G06F 3/044 (2006.01)
G06F 3/0354 (2013.01)

(52) U.S. Cl.
CPC ........ *G06F 3/04162* (2019.05); *G06F 3/0383* (2013.01); *G06F 3/03545* (2013.01); *G06F 3/0441* (2019.05); *G06F 3/0442* (2019.05); *G06F 2203/04105* (2013.01)

(58) Field of Classification Search
CPC ............. G06F 3/04162; G06F 3/03545; G06F 3/0383; G06F 3/0441; G06F 3/0442; G06F 2203/04105; G06F 3/038; G06F 3/0446; G06F 3/0414; G06F 3/0416; G06F 3/03
See application file for complete search history.

(56) References Cited

U.S. PATENT DOCUMENTS

| 9,898,109 B2 * | 2/2018 | Ciou ................... G06F 3/04162 |
| 9,977,519 B2 | 5/2018 | Lukanc et al. |
| 2018/0120963 A1 | 5/2018 | Hara |
| 2021/0103374 A1 * | 4/2021 | Liang ..................... G06F 3/038 |

FOREIGN PATENT DOCUMENTS

| WO | 2016139861 A1 | 9/2016 |
| WO | 2018029855 A1 | 8/2018 |

* cited by examiner

*Primary Examiner* — Lunyi Lao
*Assistant Examiner* — Jarurat Suteerawongsa
(74) *Attorney, Agent, or Firm* — Seed IP Law Group LLP

(57) ABSTRACT

A system includes a sensor controller, and a pen configured to periodically transmit a pen-pressure value of N bits to the sensor controller, in which the sensor controller and the pen perform pairing by bidirectionally communicating with each other. After processing for the pairing is completed, the pen periodically transmits the pen-pressure value, and, during a period before the processing for the pairing is completed, the pen transmits, instead of the pen-pressure value, a shortened pen-pressure value of high-order M bit(s) that are shorter than the N bits for the pen-pressure value.

8 Claims, 7 Drawing Sheets

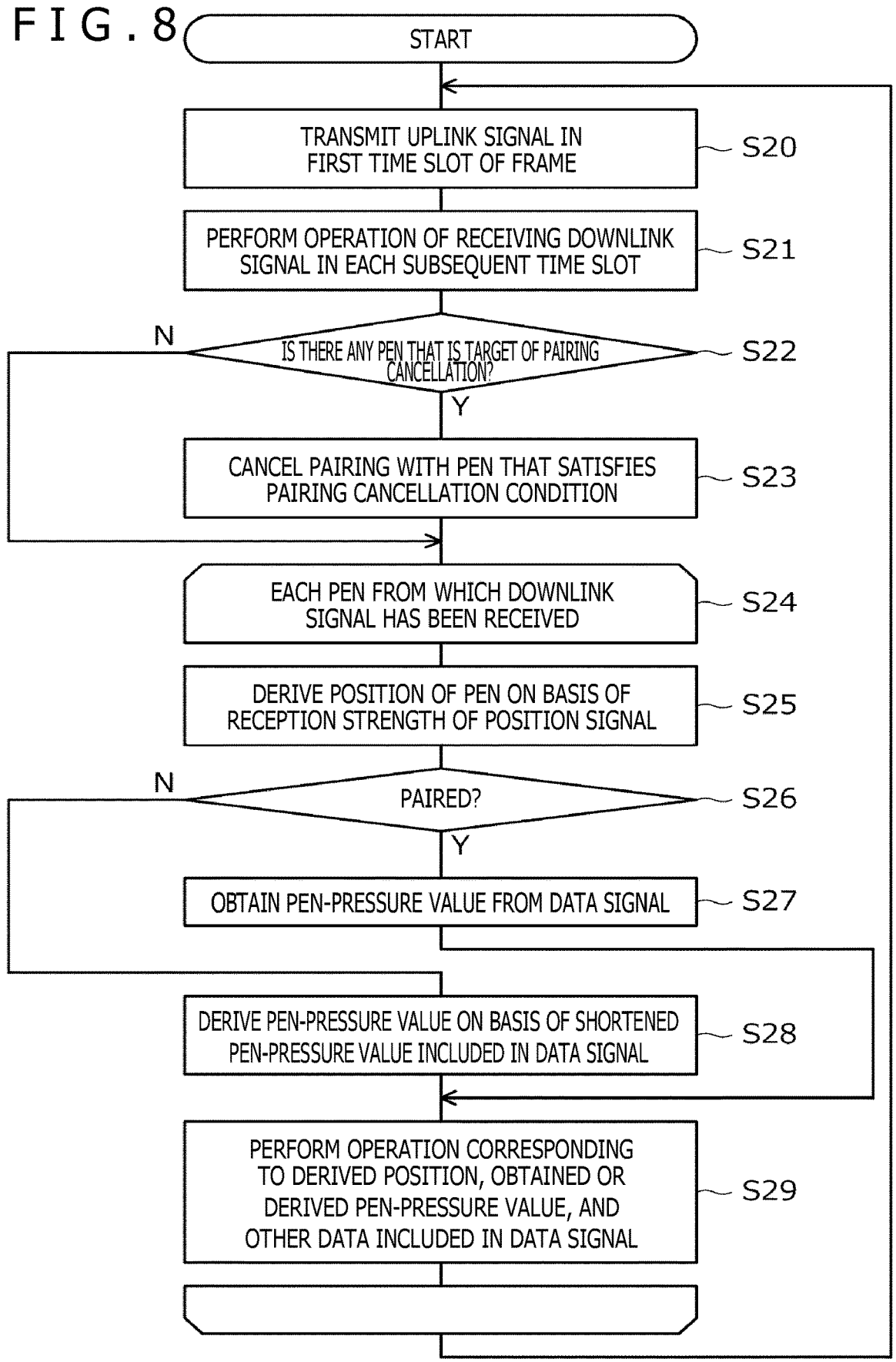

SYSTEM INCLUDING PEN AND SENSOR CONTROLLER, PEN, AND SENSOR CONTROLLER

BACKGROUND

Technical Field

The present disclosure relates to a system including a pen and a sensor controller, a pen, and a sensor controller.

Description of the Related Art

There is known a system that realizes pen input to an electronic device such as a tablet terminal through bidirectional communication between a pen and a sensor controller. In this type of system, the sensor controller periodically transmits an uplink signal, and the pen transmits a downlink signal in response to the uplink signal.

The uplink signal is a signal used to notify the pen of a frame start timing and a command for controlling the pen. A frame is used to transmit and receive signals. The downlink signal includes a position signal and a data signal. The position signal is an unmodulated carrier signal. The data signal is a carrier signal modulated by data such as a pen-pressure value. The sensor controller that has received the downlink signal detects the position of the pen on the basis of the reception strength of the position signal at each of a plurality of sensor electrodes arranged in a touch surface and obtains the data transmitted from the pen by demodulating the data signal. The pen-pressure value included in the data obtained in this way is used to control the line width or transparency of a stroke to be drawn on the basis of the detected position.

When new pen input starts in the system described above, processing for sharing a pen identification (ID) and various communication parameters (hereinafter referred to as "pairing") is performed between the pen and the sensor controller. PCT Patent Publication No. WO2016/139861, PCT Patent Publication No. WO2018/029855, and U.S. Pat. No. 9,977,519 (hereinafter respectively referred to as Patent Documents 1, 2, and 3) disclose examples of this pairing. Specifically, Patent Document 1 discloses pairing performed in such a way that a pen transmits configuration data including a stylus identifier to a sensor controller and the sensor controller transmits channel data specifying a frequency and a time slot to the pen. Patent Document 2 discloses pairing performed in such a way that a pen transmits a unique ID, which is 52-bit information that differs from pen to pen, to a sensor controller.

According to Patent Document 3, communication between a pen and a sensor controller is performed in units of frames, and the sensor controller transmits an uplink signal at the beginning of each frame. According to an example of Patent Document 3, pairing is performed in such a way that the pen that has received the uplink signal transmits a response signal (ACK) in the same frame, and the sensor controller that has received this response signal uses the uplink signal in the subsequent frame to notify the pen of a temporarily used pen ID (local ID) and one or more time slots and frequencies.

When performing the pairing described above, the pen may transmit the position signal not accompanied by the pen-pressure value. This is because, during the pairing, the size of the data to be shared between the pen and the sensor controller is large and it takes time for the pen to be ready to transmit the pen-pressure value. For example, as disclosed in an example of Patent Document 2, if the pen needs to transmit a 52-bit unique ID for pairing, the data signal runs out of free space. This prevents the pen from transmitting the pen-pressure value during the pairing.

If the pen transmits the position signal not accompanied by the pen-pressure value in this way, the line width or transparency of a stroke may become unnatural in a portion where the stroke starts to be drawn. In other words, if, for example, an electronic device is configured so as not to draw a stroke until the electronic device receives the pen-pressure value, the start position of the stroke that is actually drawn may deviate from the start position of the stroke originally intended by the user. In addition, if, for example, the electronic device is configured so as to complement an unreceived pen-pressure value with the pen-pressure value that is received at a later time, the stroke may be drawn on the basis of the pen-pressure value that is quite different from the original pen-pressure value.

BRIEF SUMMARY

Therefore, it is desirable to provide a system including a pen and a sensor controller, a pen, and a sensor controller that can minimize the unnatural appearance of the line width or transparency which would be caused by pairing at a time when a stroke starts to be drawn.

A system according to the present disclosure is a system including a sensor controller; and a pen configured to periodically transmit a pen-pressure value of N bits to the sensor controller, in which the sensor controller and the pen perform pairing by bidirectionally communicating with each other. After processing for the pairing is completed, the pen periodically transmits the pen-pressure value, and, during a period before the processing for the pairing is completed, the pen transmits, instead of the pen-pressure value, a shortened pen-pressure value of high-order M bit(s) that are shorter than the N bits for the pen-pressure value.

A pen according to the present disclosure is a pen configured to perform pairing with a sensor controller by bidirectionally communicating with the sensor controller and periodically transmit a pen-pressure value of N bits to the sensor controller. After processing for the pairing is completed, the pen periodically transmits the pen-pressure value, and, during a period before the processing for the pairing is completed, the pen transmits, instead of the pen-pressure value, a shortened pen-pressure value of high-order M bit(s) that are shorter than the N bits for the pen-pressure value.

A sensor controller according to the present disclosure is a sensor controller configured to perform pairing with a pen by bidirectionally communicating with the pen and periodically receive a pen-pressure value of N bits from the pen. When the sensor controller receives, from the pen, a shortened pen-pressure value of high-order M bit(s) that are shorter than the N bits for the pen-pressure value, the sensor controller obtains the pen-pressure value by filling low-order N−M bit(s) with a predetermined value.

According to the present disclosure, even when the pen cannot transmit the N-bit pen-pressure value, the pen can transmit the shortened pen-pressure value of the high-order M bit(s). Therefore, it is possible to minimize the unnatural appearance of the line width or transparency which would be caused by the pairing at a time when a stroke starts to be drawn.

BRIEF DESCRIPTION OF THE SEVERAL VIEWS OF THE DRAWINGS

FIG. 8 is a flowchart illustrating processing performed by a sensor controller.

DETAILED DESCRIPTION

An embodiment of the present disclosure will be described in detail below with reference to the accompanying drawings.

Figure 1:
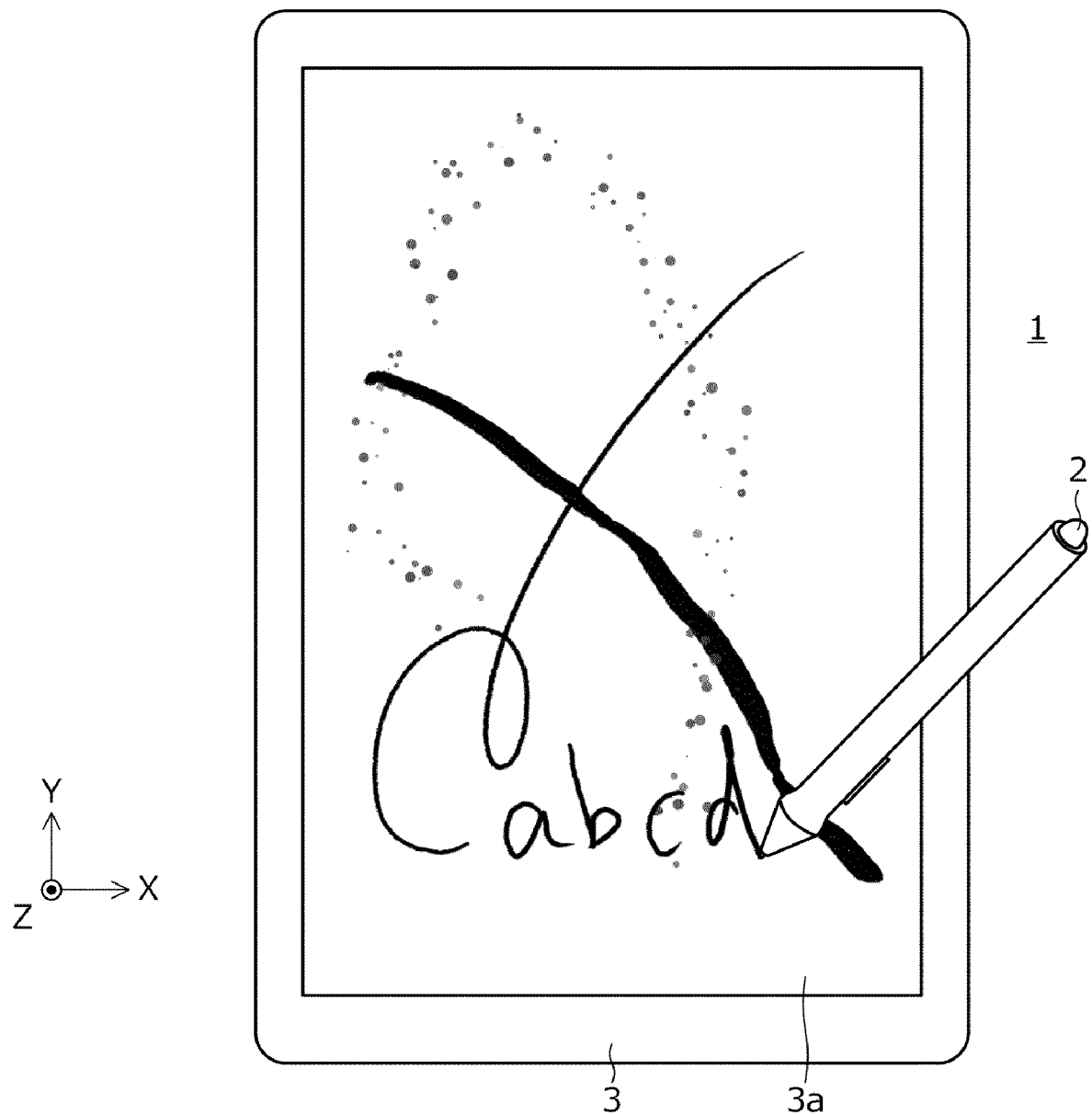
FIG. 1 is a diagram illustrating a configuration of a system according to an embodiment of the present disclosure.

FIG. 1 is a diagram illustrating a configuration of a system 1 according to the present embodiment. As illustrated in FIG. 1, the system 1 includes a pen 2 and a tablet terminal 3.

The pen 2 is a position indicator for performing pen input to the tablet terminal 3 and is used to indicate a position on a panel surface 3a of the tablet terminal 3. The user slides the pen tip of the pen 2 on the panel surface 3a to input various drawings and characters as illustrated in FIG. 1.

The tablet terminal 3 is a computer with a built-in display device such as a liquid crystal display or an organic electroluminescence (EL) display, for example. Instead of the tablet terminal 3, a laptop or desktop personal computer, or a smartphone may be used. The panel surface 3a of the tablet terminal 3 serves as both a display surface of the display device and a touch surface for pen input. The display device visually outputs drawings and characters input by the user, using the pen 2 on the panel surface 3a, according to the control of a host processor 32 (see FIG. 2) to be described later. In the following description, a horizontal direction of the panel surface 3a will be referred to as an X direction, a depth direction will be referred to as a Y direction, and a direction perpendicular to the X and Y directions will be referred to as a Z direction, as seen by the user.

The tablet terminal 3 employs a method by which the pen 2 and a sensor controller 31 (see FIG. 2) to be described later bidirectionally communicate with each other, to detect the pen 2. Specific examples of such a method include an active capacitive method and an electromagnetic induction method. In the following description, the active capacitive method is assumed to be employed. The tablet terminal 3 may also support finger input (touch input). In this case, for example, a capacitive method may be employed to detect a finger.

Figure 2:
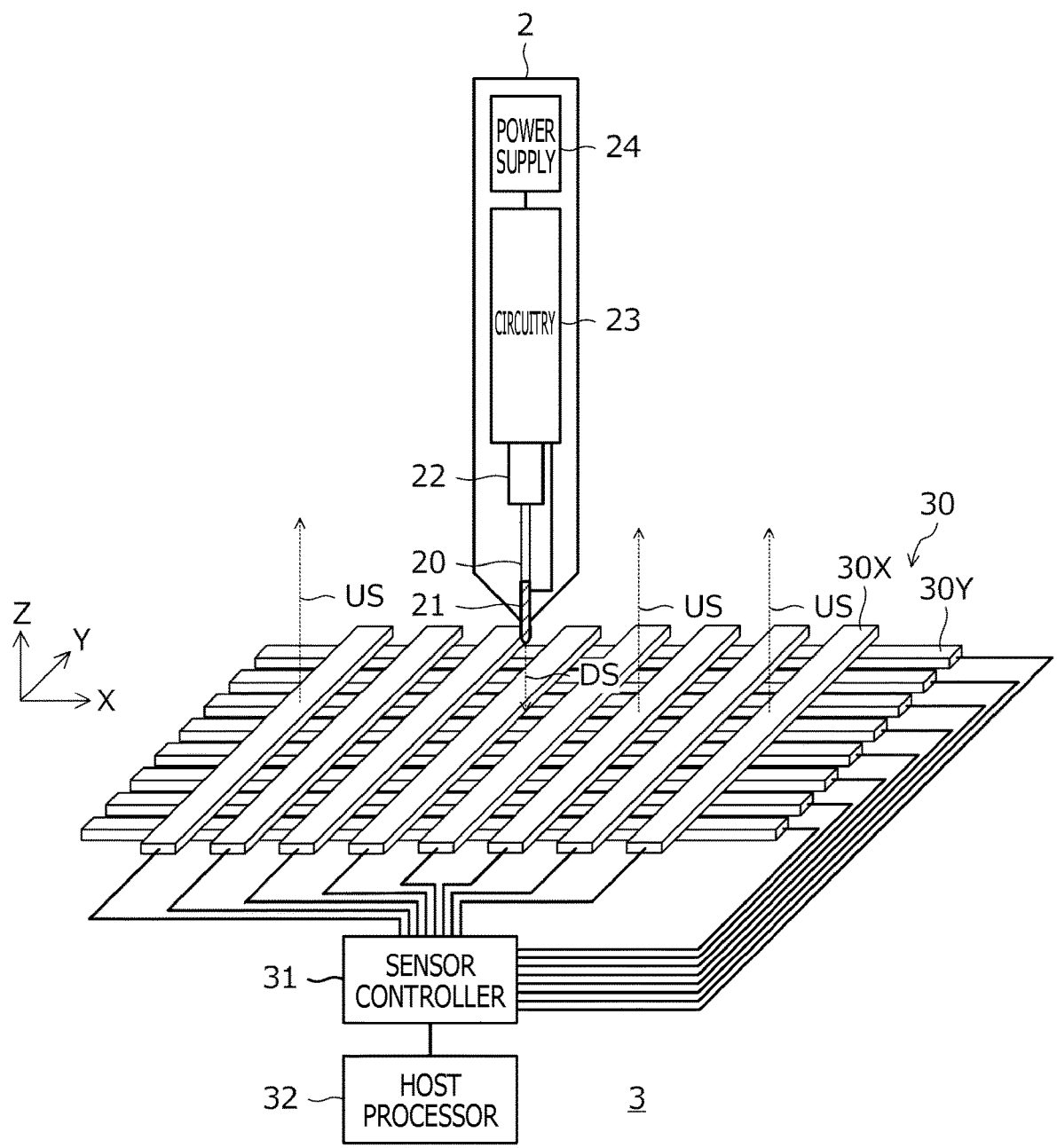
FIG. 2 is a diagram illustrating an internal configuration of a pen and a tablet terminal.

FIG. 2 is a diagram illustrating an internal configuration of each of the pen 2 and the tablet terminal 3. Note that this internal configuration of the tablet terminal 3 illustrates only a portion related to the detection of the position of the pen 2.

The pen 2 will be described first. As illustrated in FIG. 2, the pen 2 includes a core (central rod) 20, a pen-tip electrode 21, a pen-pressure detection sensor 22, circuitry 23, and a power supply 24. A cylindrical AAAA battery is used as the power supply 24, for example.

The core 20 is a rod-shaped member disposed such that its longitudinal direction is aligned with a pen axis direction of the pen 2. The core 20 has a tip end portion whose surface is coated with a conductive material, constituting the pen-tip electrode 21. The core 20 has a rear end portion held against the pen-pressure detection sensor 22. The pen-pressure detection sensor 22 detects a pressure (pen pressure) applied to a tip end of the core 20.

The circuitry 23 is an integrated circuit that performs various processes to be described later by reading and executing programs stored in a built-in memory, and has a function of receiving an uplink signal US transmitted from the panel surface 3a of the tablet terminal 3 via the pen-tip electrode 21 and a function of transmitting a downlink signal DS to the panel surface 3a of the tablet terminal 3 via the pen-tip electrode 21. In addition to the above-described programs, a pen ID pre-allocated to the pen 2 is also written to the built-in memory of the circuitry 23.

Next, the tablet terminal 3 will be described. The tablet terminal 3 includes a sensor 30, the sensor controller 31, and the host processor 32.

The sensor 30 is a touch sensor embedded under the panel surface 3a and includes a plurality of sensor electrodes 30X and 30Y, each of which is capacitively coupled to the pen-tip electrode 21. The plurality of sensor electrodes 30X extend in the Y direction and are arranged side by side at a fixed pitch in the X direction. The plurality of sensor electrodes 30Y extend in the X direction and are arranged side by side at a fixed pitch in the Y direction. As illustrated in FIG. 2, the plurality of sensor electrodes 30X is superimposed on the plurality of sensor electrodes 30Y in the Z direction. Although the sensor electrodes 30X and 30Y are illustrated as plate-shaped conductors in FIG. 2, the sensor electrodes 30X and 30Y may be, in actual implementation, conductors of a different shape such as mesh conductors.

The sensor controller 31 is an integrated circuit that performs various processes to be described later by reading and executing programs stored in a built-in memory and has a function of receiving the downlink signal DS transmitted from the pen 2 via the sensor 30 and a function of transmitting the uplink signal US to the pen 2 via the sensor 30. As illustrated in FIG. 2, the sensor controller 31 is connected to each of the plurality of sensor electrodes 30X and 30Y.

The uplink signal US is transmitted from the sensor controller 31 to the pen 2 to notify the pen 2 of a frame start timing and a command for controlling the pen 2. A frame is used to transmit and receive signals. The command includes, for example, a command that specifies a time slot in a frame (to be described later) and a command that specifies the data that the pen 2 needs to transmit. The pen 2 that has received the uplink signal US obtains a transmission and reception schedule for the uplink signal US and the downlink signal DS according to the command included in the uplink signal US and generates the downlink signal DS. Then, the pen 2 transmits the generated downlink signal DS and receives the next uplink signal US according to the obtained transmission and reception schedule.

The downlink signal DS includes a position signal and a data signal. The position signal is an unmodulated carrier signal (burst signal). The data signal is a carrier signal modulated by the data to be transmitted to the sensor controller 31. The data transmitted using the data signal includes, for example, various types of data required for pairing (e.g., the above-described pen ID) and a pen-pressure value indicating the value of the pen pressure detected by the pen-pressure detection sensor 22. Hereinafter, the data required for pairing will be referred to as "pairing data." The sensor controller 31 that has received the downlink signal DS derives the position of the pen 2 on the panel surface 3a on the basis of the reception strength of the position signal at each of the sensor electrodes 30X and 30Y and also obtains the data transmitted from the pen 2 by demodulating the data signal. The derived position and the obtained data are sequentially supplied from the sensor controller 31 to the host processor 32.

Figure 3:
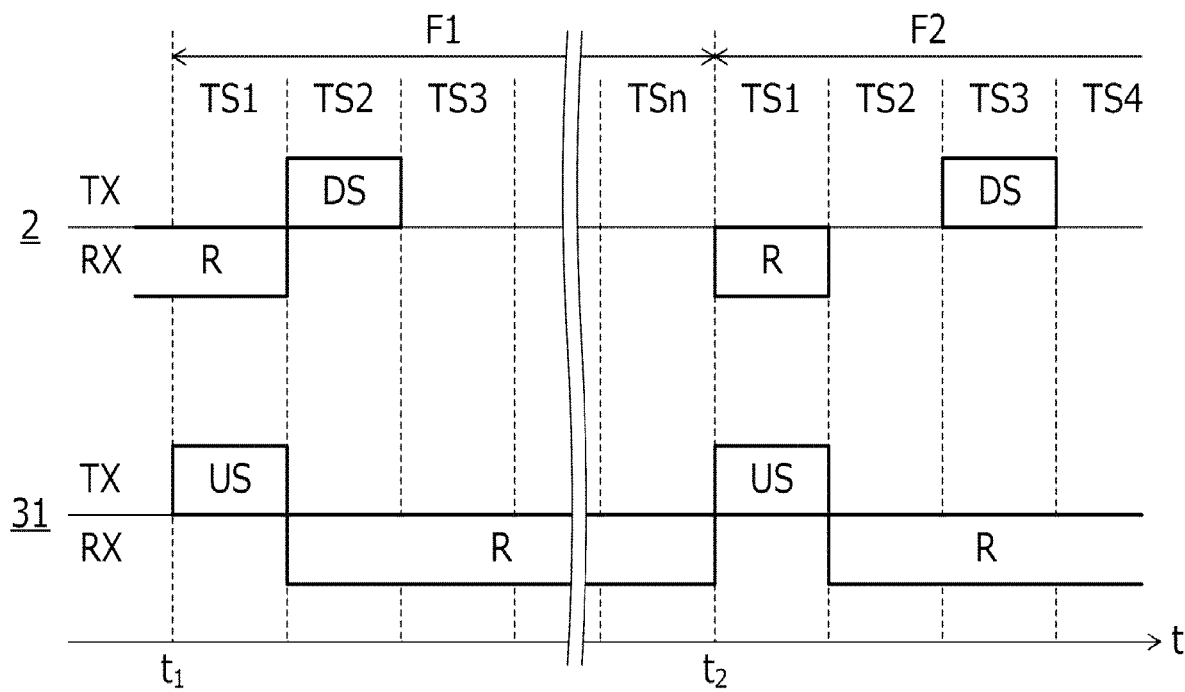
FIG. 3 is a diagram illustrating a structure of a frame used to transmit and receive an uplink signal and a downlink signal.

FIG. 3 is a diagram illustrating a structure of a frame used to transmit and receive the uplink signal US and the downlink signal DS. As understood from FIG. 3, the transmission and reception of the uplink signal US and the downlink signal DS according to the present embodiment are performed by time division multiplexing, and each frame F is divided into n time slots TS. Instead of or together with time division multiplexing, frequency division multiplexing or code division multiplexing may be used. The sensor controller 31 transmits the uplink signal US in a time slot TS1, which is at the head (beginning) of each frame F. The pen 2 obtains the time positions of the frame F and each time slot TS by receiving the uplink signal US, and transmits the downlink signal DS, using part or all of the subsequent multiple time slots TS in the same frame F as the received uplink signal US.

FIG. 3 illustrates the case where pairing between the pen 2 and the sensor controller 31 is newly performed. The pen 2 that is not paired with the sensor controller 31 continuously or intermittently performs an operation of receiving the uplink signal US (denoted as "R" in FIG. 3). As a result of this receiving operation, if the pen 2 receives the uplink signal US transmitted at the head of a frame F1 (time $t_1$) illustrated in FIG. 3, the pen 2 transmits the downlink signal DS, using a time slot TS2 predetermined for the unpaired pen 2. At this time, the pen 2 includes the pairing data in the data signal to be included in the downlink signal DS. In addition, the pen 2 starts an operation of receiving the uplink signal US at time t2, which is the start timing of a frame F2.

The sensor controller 31 that has received the pairing data from the unpaired pen 2 stores the received pairing data and determines one or more time slots TS to be allocated to the pen 2. Then, the sensor controller 31 notifies the pen 2 of the determined one or more time slots TS, using the uplink signal US transmitted at the head of the frame F2 (time t2), for example. The pen 2 that has received this notification determines that pairing has been established and transmits the downlink signal DS, using the notified one or more time slots TS in and after the frame F2. The sensor controller 31 determines that the pairing has been established by receiving the downlink signal DS transmitted in this way.

Since the pairing data is a large amount of data that exceeds, for example, 50 bits, the pen 2 may be unable to transmit the entire pairing data in a single time slot TS. In such a case, the pen 2 needs to transmit the downlink signal DS including the pairing data, using time slots TS2 of multiple frames F. In this case, after receiving the entire pairing data, the sensor controller 31 determines one or more time slots TS to be allocated to the pen 2 that has transmitted the pairing data and notifies the pen 2 of the determined one or more time slots TS, using the uplink signal US.

Referring back to FIG. 2, the host processor 32 is a central processing unit of the tablet terminal 3 and executes an operation system and various applications of the tablet terminal 3 by reading and executing programs stored in a storage device, not illustrated.

The applications executed by the host processor 32 include a drawing application. The drawing application generates stroke data according to the position and data (including the pen-pressure value) sequentially supplied from the sensor controller 31. Specifically, the drawing application generates a curve such as a Bezier curve or a Catmull-Rom curve on the basis of a series of positions and controls the line width or transparency of the generated curve according to the pen-pressure value. In this way, the drawing application generates the stroke data. The drawing application renders the generated stroke data and supplies the stroke data to the display device described above to draw a stroke on the panel surface 3a illustrated in FIG. 1. The drawing application also generates digital ink including the generated stroke data and stores the digital ink in the storage device, not illustrated, while transmitting the digital ink to another computer.

The basic configurations of the pen 2 and the tablet terminal 3 and the basic processing performed by the pen 2 and the sensor controller 31 have been described above. In the following description, the processing performed by the pen 2 and the sensor controller 31 in order to minimize the unnatural appearance of the line width or transparency which would be caused by pairing at a time when a stroke starts to be drawn will be described in detail.

Figure 4A:
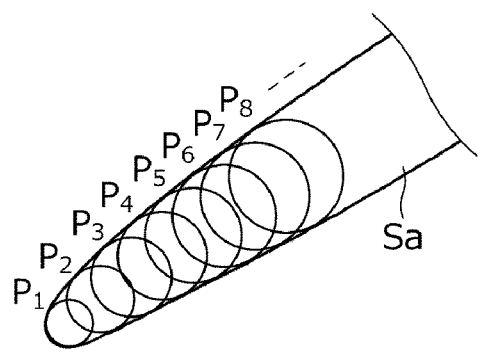
FIGS. 4A to 4C are diagrams each illustrating stroke data when pen input starts during an unpaired state.
Figure 4B:
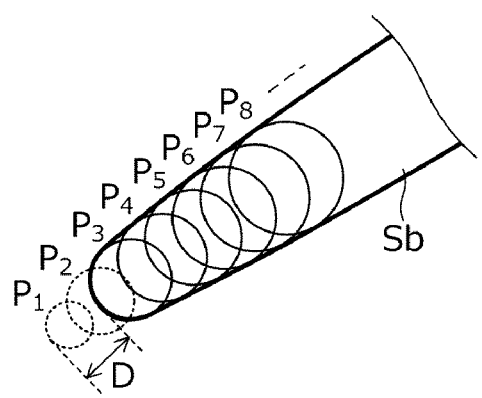
Figure 4C:
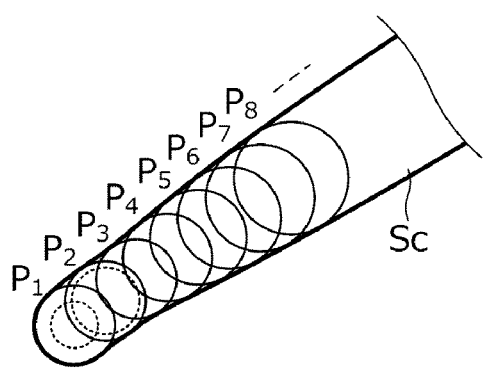

First, challenges to be addressed by the present disclosure will be described with reference to FIGS. 4A to 4C. FIGS. 4A to 4C respectively illustrate pieces of stroke data Sa to Sc when pen input starts during an unpaired state. Positions $P_1$ to $P_8$ illustrated in FIGS. 4A to 4C represent the positions derived by the sensor controller 31 on the basis of the position signals sequentially transmitted from the pen 2. The size of the circle corresponding to each of the positions $P_1$ to $P_8$ represents the magnitude of the pen-pressure value (the value of the pen pressure detected by the pen-pressure detection sensor 22 of the pen 2) at that time. In the example described here, the sensor controller 31 controls the line width of the stroke data by deriving an envelope of these circles. This similarly applies to the case where the sensor controller 31 controls the transparency of the stroke data on the basis of the pen-pressure value.

FIG. 4A illustrates an ideal case where all the downlink signals DS include the pen-pressure value each. In this case, the sensor controller 31 can successfully obtain the pen-pressure value corresponding to each of the positions $P_1$ to $P_8$. Here, as illustrated in FIG. 4A, the sensor controller 31 controls the line width of the stroke data by deriving the envelope of the circles representing the pen-pressure values. Therefore, if the sensor controller 31 successfully obtains all the pen-pressure values, the stroke that corresponds to actual user movement is naturally drawn even at a start portion of the stroke, like the stroke data Sa illustrated in FIG. 4A.

FIG. 4B illustrates a case where the pen-pressure value is not included in either of the downlink signals DS corresponding to the positions $P_1$ and $P_2$. As described above, the pen 2 that is performing pairing needs to include a large amount of pairing data in the data signal to be included in the downlink signal DS. As a result, the pen 2 may be unable to include the pen-pressure value in the data signal even when the pen tip is in contact with the panel surface 3a. In such a case, as illustrated in FIG. 4B, the sensor controller 31 cannot obtain the pen-pressure values corresponding to several positions (the positions $P_1$ and $P_2$ in the example of FIG. 4B) that correspond to a portion where the stroke is supposed to start to be drawn.

If, in this case, the host processor 32 does not draw the stroke until the pen-pressure value can be obtained, the start position of the stroke that is actually drawn deviates (by a distance D illustrated in FIG. 4B) from the start position of the stroke originally intended by the user, as illustrated in FIG. 4B. In other words, even though the user has intended to draw the stroke at the positions $P_1$ and $P_2$ also, the stroke starts to be drawn only from the position $P_3$, which gives the user a sense of unease.

FIG. 4C illustrates one possible processing that can improve the case illustrated in FIG. 4B. The host processor 32 that performs this processing generates the stroke data by considering the pen-pressure value corresponding to the position $P_3$, which is derived immediately after the positions $P_1$ and $P_2$, as the pen-pressure value for the positions $P_1$ and $P_2$. If the host processor 32 performs the processing in this way, the stroke data can also be drawn at the positions $P_1$ and $P_2$ as illustrated in FIG. 4C and the above-described deviation can be alleviated. However, the line width becomes unnatural in the portion where the stroke starts to be drawn.

In order to address the above-described challenges, in the present embodiment, the pen 2 periodically transmits a pen-pressure value of N bits to the sensor controller 31 after the processing for pairing is completed, whereas the pen 2 transmits a shortened pen-pressure value of high-order M bit(s) that are shorter than the N bits for the pen-pressure value, to the sensor controller 31 during a period before the processing for pairing is completed. This processing will be described in detail below with reference to a processing flow of each of the pen 2 and the sensor controller 31.

Figure 5:
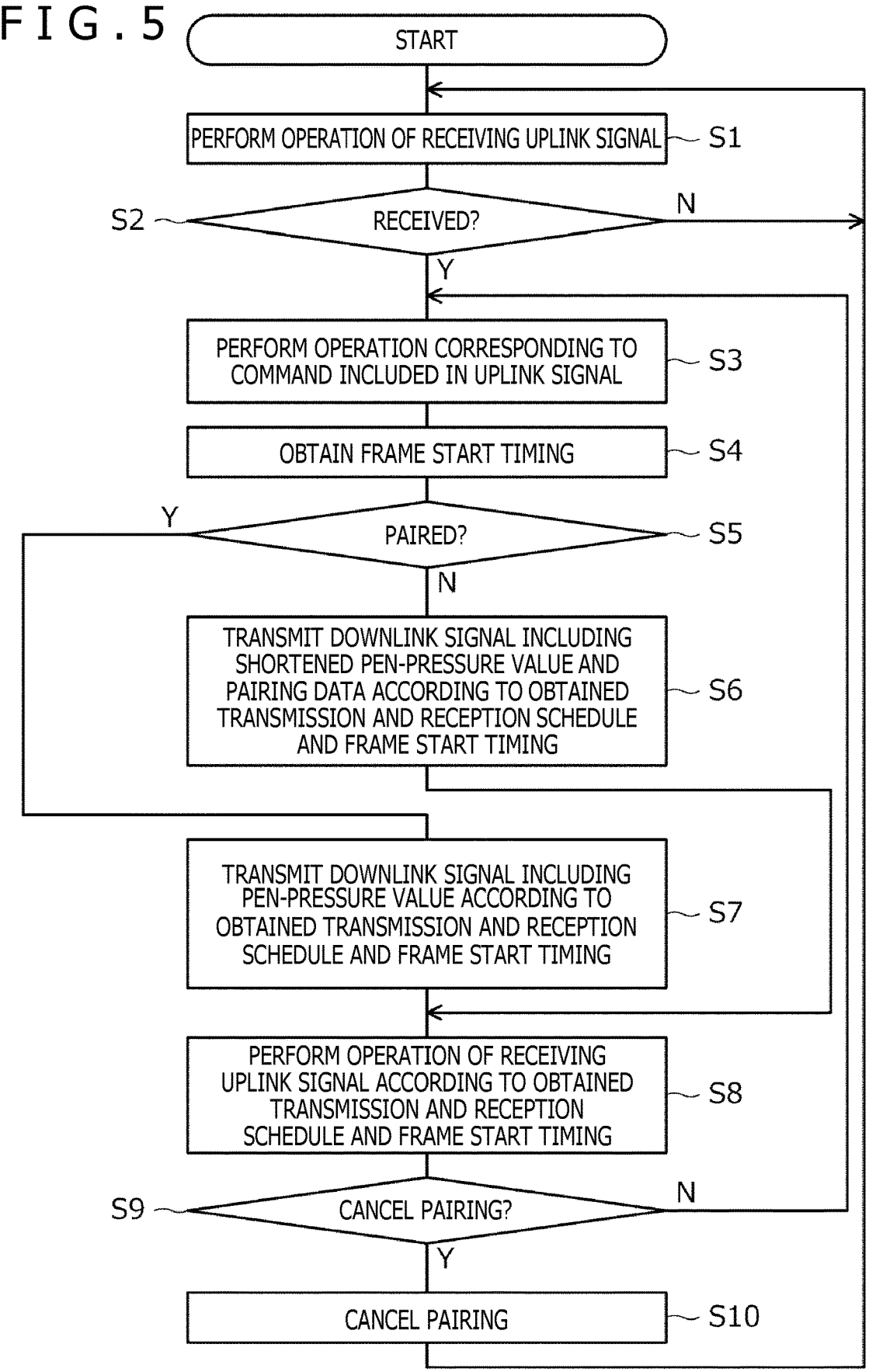
FIG. 5 is a flowchart illustrating processing performed by circuitry of the pen.

FIG. 5 is a flowchart illustrating the processing performed by the circuitry 23 of the pen 2. The initial state of the processing illustrated in FIG. 5 is a state in which the pen 2 and the sensor controller 31 have not been paired. As illustrated in FIG. 5, the circuitry 23 first performs an operation of receiving the uplink signal US (step S1). Then, the circuitry 23 determines whether or not the uplink signal US has been received (step S2). When the uplink signal US has not been received, the circuitry 23 waits for the reception of the uplink signal US by repeatedly performing the processing of step S1.

On the other hand, when the circuitry 23 determines in step S2 that the uplink signal US has been received, the circuitry 23 performs the operation corresponding to a command included in the uplink signal US (step S3). For example, if the command directs the transmission of certain data, the circuitry 23 performs an operation of generating the downlink signal DS including that data in step S3. If the command notifies the circuitry 23 of a local ID, the circuitry 23 performs an operation of storing the local ID in the memory in step S3. If the command specifies a time slot (or a frequency or spreading code), the circuitry 23 performs, in step S3, an operation of determining the transmission and reception schedule for the uplink signal US and the downlink signal DS, and then storing, in the memory, information indicating the determined transmission and reception schedule and information indicating that the pairing has been established.

The circuitry 23 further obtains the frame start timing on the basis of the reception timing of the uplink signal US (step S4). On the basis of the timing obtained in step S4 and the transmission and reception schedule determined in step S3, the circuitry 23 performs the subsequent reception and transmission of the uplink signal US and the downlink signal DS.

Next, the circuitry 23 determines whether or not the pairing has been established with the sensor controller 31 (step S5). When the circuitry 23 determines that the pairing has not been established with the sensor controller 31, the circuitry 23 transmits the downlink signal DS including the shortened pen-pressure value and the pairing data according to the obtained transmission and reception schedule and frame start timing (step S6). The shortened pen-pressure value will be described in detail later. On the other hand, when the circuitry 23 determines in step S5 that the pairing has been established with the sensor controller 31, the circuitry 23 transmits the downlink signal DS including the pen-pressure value according to the obtained transmission and reception schedule and frame start timing (step S7).

After step S6 or S7, the circuitry 23 performs an operation of receiving the uplink signal US according to the obtained transmission and reception schedule and frame start timing (step S8). Depending on the result of this operation, the circuitry 23 determines whether or not a pairing cancellation condition, such as a condition that the uplink signal US has not been received for a predetermined period of time, has been satisfied (step S9). When the sensor controller 31 determines in step S9 that the pairing cancellation condition has been satisfied, the sensor controller 31 cancels the pairing (step S10) and returns to step S1 to continue the processing. On the other hand, when the sensor controller 31 determines in step S9 that the pairing cancellation condition has not been satisfied, the sensor controller 31 returns to step S3 to continue the processing.

Figure 6A:
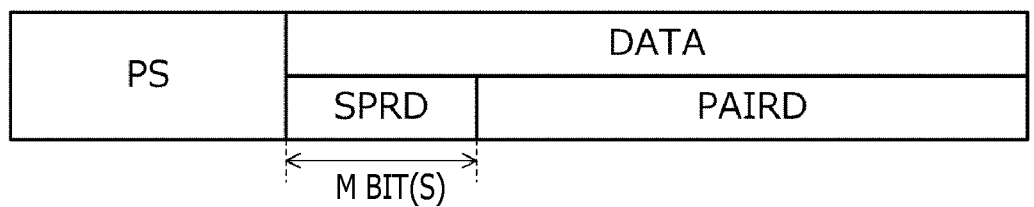
FIG. 6A is a diagram illustrating a downlink signal transmitted from the circuitry in step S6 of FIG. 5.
Figure 6B:
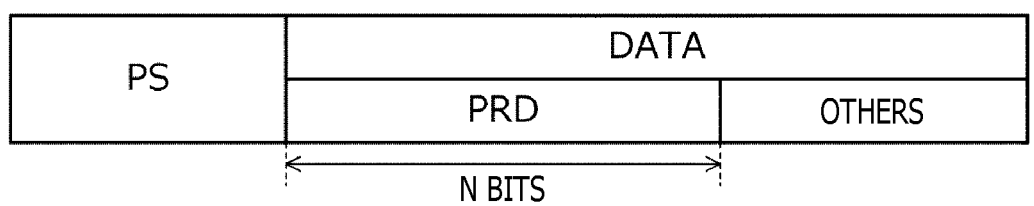
FIG. 6B is a diagram illustrating a downlink signal transmitted from the circuitry in step S7 of FIG. 5.

FIG. 6A is a diagram illustrating the downlink signal DS transmitted from the circuitry 23 in step S6. FIG. 6B is a diagram illustrating the downlink signal DS transmitted from the circuitry 23 in step S7. As illustrated in FIGS. 6 and 7, while each of the downlink signals DS includes a position signal PS and a data signal DATA, the contents of the data signal DATA in step S6 are different from the contents of the data signal DATA in step S7.

Specifically, the data signal DATA (a second data signal) transmitted in step S6 includes a shortened pen-pressure value SPRD and pairing data PAIRD. The data signal DATA (a first data signal) transmitted in step S7 includes a pen-pressure value PRD and other data. The other data includes, for example, data indicating the on/off state of a switch disposed on a surface of the pen 2.

Figure 7A:
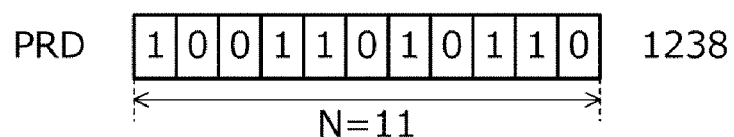
FIG. 7A is a diagram illustrating an example of a structure of a pen-pressure value.
Figure 7B:
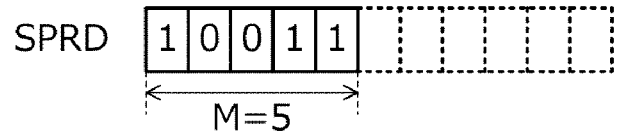
FIG. 7B is a diagram illustrating a structure of a shortened pen-pressure value corresponding to the pen-pressure value illustrated in FIG. 7A.

FIG. 7A is a diagram illustrating an example of a structure of the pen-pressure value PRD. FIG. 7B is a diagram illustrating a structure of the shortened pen-pressure value SPRD corresponding to the pen-pressure value PRD illustrated in FIG. 7A. As illustrated in FIG. 7A, the pen-pressure value PRD is N-bit data (N is a natural number of 2 or greater). In this example, N=11. The shortened pen-pressure value SPRD is represented by the high-order M bit or bits ($1 \leq M < N$) portion of the pen-pressure value PRD, where the M bit(s) are shorter than the N bits, as illustrated in FIG. 7B. In the example illustrated in FIG. 7B, M=5. In this way, the shortened pen-pressure value SPRD is represented by only the high-order M bit(s) extracted from the original pen-pressure value PRD. This increases a possibility that the shortened pen-pressure value SPRD can be transmitted even when the pairing data PAIRD needs to be transmitted.

FIG. 8 is a flowchart illustrating the processing performed by the sensor controller 31. As illustrated in FIG. 8, the sensor controller 31 first transmits the uplink signal US in the first time slot TS of a frame (step S20), and then performs an operation of receiving the downlink signal DS in each subsequent time slot (step S21). Then, the sensor controller 31 determines whether or not there is any pen 2 that satisfies the pairing cancellation condition, such as a condition that the downlink signal DS has not been received for a predetermined period of time (step S22). When the sensor controller 31 determines that there is such pen, the sensor controller 31 cancels the pairing with the pen 2 that satisfies the pairing cancellation condition (step S23).

When the sensor controller 31 determines in step S22 that there is no pen 2 that satisfies the pairing cancellation condition, or when the processing of step S23 has been completed, the sensor controller 31 performs processing of steps S25 to S29 for each pen 2 from which the downlink signal DS has been received (step S24).

Specifically, the sensor controller 31 first derives the position of the pen 2 to be processed on the basis of the reception strength of the position signal PS at each of the sensor electrodes 30X and 30Y (see FIG. 2) (step S25). Next, the sensor controller 31 determines whether or not the pairing has been established with the pen 2 to be processed (step S26). The result of this determination becomes affirmative after the sensor controller 31 stores information indicating that the pairing has already been established in the memory in step S29 to be described later.

When the sensor controller 31 determines in step S26 that the pairing has already been established, the sensor controller 31 obtains the pen-pressure value PRD by extracting the pen-pressure value PRD from the data signal DATA (step S27) and proceeds to the processing of step S29. On the other hand, when the sensor controller 31 determines in step S26 that the pairing has not been established, the sensor controller 31 performs a process of deriving the pen-pressure value PRD on the basis of the shortened pen-pressure value SPRD included in the data signal DATA (step S28) and proceeds to the processing of step S29.

Figure 7C:
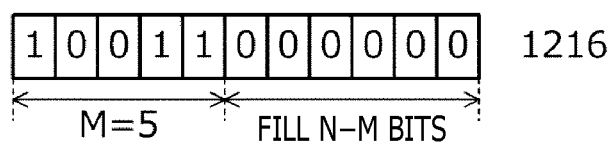
FIG. 7C is a diagram illustrating a pen-pressure value derived in step S28 of FIG. 8 when the shortened pen-pressure value is the one illustrated in FIG. 7B.

FIG. 7C illustrates the pen-pressure value PRD derived in step S28 when the shortened pen-pressure value SPRD is the one illustrated in FIG. 7B. As illustrated in FIG. 7C, the sensor controller 31 derives the pen-pressure value PRD by treating the shortened pen-pressure value SPRD as constituting the high-order M bit(s) of the N-bit pen-pressure value PRD and filling the low-order N–M bit(s) with a predetermined value. Although it may be preferable to use "0" as the predetermined value for filling as illustrated in FIG. 7C, "1" may also be used. The pen-pressure value PRD derived in this way includes an error. However, since the high-order M bits are correct, the pen-pressure value PRD (=1216) derived here is close to the correct pen-pressure value PRD (=1238) illustrated in FIG. 7A.

Referring back to FIG. 8, the sensor controller 31 performs the operation corresponding to the position derived in step S25, the pen-pressure value PRD obtained in step S27 or derived in step S28, and other data included in the data signal (step S29). As a specific example, the sensor controller 31 performs an operation of supplying the derived position and the obtained or derived pen-pressure value to the host processor 32. The host processor 32 generates stroke data on the basis of the position and the pen-pressure value supplied in this way. Further, for example, when the sensor controller 31 receives the pairing data from the pen 2 with which pairing is being performed, the sensor controller 31 performs a process of storing the pairing data in the memory. When the sensor controller 31 receives all the necessary pairing data, the sensor controller 31 also stores information indicating that the pairing has already been established in the memory. At the same time, the sensor controller 31 performs a process of determining a time slot (or a frequency or spreading code) to be allocated to the pen 2 and including the data indicating the determined time slot (or frequency or spreading code) in the uplink signal US to be transmitted next. When the sensor controller 31 has completed the processing of steps S25 to S29 for all the pens 2 from which the downlink signal DS has been received, the sensor controller 31 returns to step S20 to continue the processing.

As described above, with the system 1 according to the present embodiment, even when the pen 2 cannot transmit the N-bit pen-pressure value PRD, the pen 2 can transmit the shortened pen-pressure value SPRD represented by the high-order M bit(s) portion of the pen-pressure value PRD. Therefore, it is possible to minimize the unnatural appearance of the line width or transparency which would be caused by pairing in a portion where a stroke starts to be drawn.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a sensor controller; and
a pen configured to periodically transmit a pen-pressure value of N bits to the sensor controller,
wherein the sensor controller and the pen perform pairing by bidirectionally communicating with each other,
after processing for the pairing is completed, the pen periodically transmits the pen-pressure value, and
during a period before the processing for the pairing is completed, the pen transmits to the sensor controller, instead of the pen-pressure value, a shortened pen-pressure value of high-order M bit(s) that are shorter than the N bits for the pen-pressure value.

2. The system according to claim 1,
wherein, when the sensor controller receives the shortened pen-pressure value from the pen, the sensor controller obtains the pen-pressure value by filling low-order N–M bit(s) with a predetermined value.

3. The system according to claim 2,
wherein, after the processing for the pairing is completed, the sensor controller obtains the pen-pressure value by extracting the pen-pressure value from a data signal transmitted from the pen, and
during the period before the processing for the pairing is completed, the sensor controller obtains the pen-pressure value by filling the low-order N–M bit(s) with the predetermined value, wherein the low-order N–M bit(s) are included in the data signal and are less significant than the high-order M bit(s) representing the shortened pen-pressure value.

4. The system according to claim 1,
wherein, after the processing for the pairing is completed, the pen transmits a first data signal including the pen-pressure value, together with a position signal, and during the period before the processing for the pairing is completed, the pen transmits a second data signal including the shortened pen-pressure value, together with the position signal.

5. The system according to claim 4,
wherein the second data signal includes at least part of a pen identification prewritten to the pen.

6. A pen configured to perform pairing with a sensor controller by bidirectionally communicating with the sensor controller and periodically transmit a pen-pressure value of N bits to the sensor controller, the pen comprising:
a memory; and
circuitry,
wherein, after processing for the pairing is completed, the pen periodically transmits the pen-pressure value, and
during a period before the processing for the pairing is completed, the pen transmits to the sensor controller, instead of the pen-pressure value, a shortened pen-pressure value of high-order M bit(s) that are shorter than the N bits for the pen-pressure value.

7. A sensor controller configured to perform pairing with a pen by bidirectionally communicating with the pen and periodically receive a pen-pressure value of N bits from the pen, the sensor controller comprising:
a memory; and
circuitry,
wherein, after processing for the pairing is completed, the pen periodically transmits the pen-pressure value, and
during a period before the processing for the pairing is completed, when the sensor controller receives, from the pen, a shortened pen-pressure value of high-order M bit(s) that are shorter than the N bits for the pen-pressure value, the sensor controller obtains the pen-pressure value by filling low-order N-M bit(s) with a predetermined value.

8. The sensor controller according to claim 7,
wherein, after processing for the pairing is completed, the sensor controller obtains the pen-pressure value by extracting the pen-pressure value from a data signal transmitted from the pen, and
during a period before the processing for the pairing is completed, the sensor controller obtains the pen-pressure value by filling the low-order N–M bit(s) with the predetermined value, wherein the low-order N–M bit(s) are included in the data signal and are less significant than the high-order M bit(s) representing the shortened pen-pressure value.

\* \* \* \* \*